(12) United States Patent
Ahn

(10) Patent No.: US 7,633,850 B2
(45) Date of Patent: *Dec. 15, 2009

(54) TRANSMITTER, RECEIVER, TRANSMITTING METHOD, RECEIVING METHOD, AND PROGRAM

(75) Inventor: Chang-Jun Ahn, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 551 days.

This patent is subject to a terminal disclaimer.

(21) Appl. No.: 10/582,815

(22) PCT Filed: Dec. 18, 2003

(86) PCT No.: PCT/JP03/16275

§ 371 (c)(1),
(2), (4) Date: Jun. 14, 2006

(87) PCT Pub. No.: WO2005/062509

PCT Pub. Date: Jul. 7, 2005

(65) Prior Publication Data

US 2007/0159958 A1    Jul. 12, 2007

(51) Int. Cl.
*H04J 11/00* (2006.01)
(52) U.S. Cl. ..................... 370/208; 370/210
(58) Field of Classification Search ........... 370/203, 370/208, 210; 375/229, 260, 264
See application file for complete search history.

(56) References Cited

U.S. PATENT DOCUMENTS 6,363,121 B1 * 3/2002 Hochwald et al. ........... 375/260

(Continued)

FOREIGN PATENT DOCUMENTS

JP    10-107761    4/1998

(Continued)

OTHER PUBLICATIONS

Article from Technical Report of IEICE, Oct. 2002 entitled *Convolutional Coded Coherent and Differential Unitary Space-Time Modulated OFDM with Bit Interleaving for Multiple Antennas System.*

(Continued)

*Primary Examiner*—Albert T Chou
(74) *Attorney, Agent, or Firm*—Howard & Howard Attorneys PLLC

(57) ABSTRACT

A coding section 201 of a transmitter receives an input of a transmitting signal and LDPC-codes the received signal, a serial-to-parallel conversion section 102 converts the coded signal from serial to parallel, and outputs m (m≧2) intermediate signals, a unitary matrix modulation section 103 modulates the m intermediate signals to a unitary matrix of m rows and m columns where elements excepting diagonal elements are zero, and outputs an obtained matrix, a split section 111 supplies each of the diagonal elements of the matrix to each input channel of an inverse Fourier transform section 112 as an input signal, the inverse Fourier transform section 112 inversely Fourier transforms the input signals supplied to the input channels, and outputs the obtained m inversely Fourier transformed signals, a parallel-to-serial conversion section 113 converts the m inversely Fourier transformed signals from parallel to serial, and outputs one transmission signal, a transmitting section 114 transmits the output transmission signal, and any of frequency differences between the channels of the inverse Fourier transform section 112 is a predetermined coherent bandwidth or more.

16 Claims, 10 Drawing Sheets

U.S. PATENT DOCUMENTS

| | | | |
|---|---|---|---|
| 6,510,133 B1 * | 1/2003 | Uesugi | 370/208 |
| 2005/0147182 A1 * | 7/2005 | Lee et al. | 375/299 |
| 2006/0188032 A1 * | 8/2006 | Kim et al. | 375/260 |
| 2006/0232416 A1 * | 10/2006 | Bauch | 340/572.7 |

FOREIGN PATENT DOCUMENTS

| | | |
|---|---|---|
| JP | 2001-285242 | 10/2001 |
| JP | 2002-185428 | 6/2002 |
| WO | PCT/JP03/16275 | 12/2003 |
| WO | WO 2005/062509 A1 | 7/2005 |

OTHER PUBLICATIONS

Article from Technical Report of IEICE, Jan. 2003 entitled *LDPC Coded Unitary Space-Time Modulated OFDM in Broadband Mobile Channel*.

Article from IEEE Transactions of Information Theory, Mar. 2000 entitled *Unitary Space-Time Modulation for Multiple-Antenna Communications in Rayleigh Flat Fading*.

* cited by examiner

TRANSMITTER, RECEIVER, TRANSMITTING METHOD, RECEIVING METHOD, AND PROGRAM

TECHNICAL FIELD

The preset invention relates to a transmitter, receiver, transmitting method, and receiving method that perform efficient communication using modulation and demodulation with a unitary matrix where elements excepting the diagonal elements are zero by use of a low density parity check (LDPC) code, and program for implementing these on a computer.

BACKGROUND ART

The technique relating to OFDM (Orthogonal Frequency Division Multiplex) modulation and demodulation and the technique relating to modulation and demodulation with the unitary matrix are conventionally disclosed in the following documents.

[Patent Document 1] Unexamined Japanese Patent Publication No. 2002-185428

[Patent Document 2] Unexamined Japanese Patent Publication No. 2001-285242

[Patent Document 3] Unexamined Patent Publication Hei. No. 10-107761

[Non-Patent Document 1] Chang-Jun Ahn and Iwao Sasase, "Convolutional Coded Coherent and Differential Unitary Space-Time Modulated OFDM with Bit Interleaving for Multiple Antennas system", Shingakugiho, TECHNICAL REPORT OF IEICE, SST2002-47, October, 2002, pp. 75 to 80

The Patent document 1 discloses an invention relating to an OFDM communication system.

Particularly, this discloses a system in which a received OFDM signal is transformed to frequency-domain components by a fast Fourier transform, the frequency-domain components are processed to timing components, timing information is derived from the timing components, and timing information is applied to the received OFDM signal to be synchronize with a receiver.

The patent document 2 discloses an invention relating to an OFDM demodulation apparatus that receives a PSK signal, which is sent by OFDM modulation to transmit information using phase components, and that performs soft decision decoding of this signal.

Particularly, there is disclosed the method relating to a con on in which a filter property of a band limiting filter that cuts off out-of-band components from a received signal is detected an output signal of the band limiting filter is converted to a phase signal, thereafter the phase signal is corrected according to the lifter property and soft decision decoding is performed.

The patent document 3 discloses an invention relating to a coding transmission system and a transmitter and a receiver based on an OFDM method.

Especially, this discloses the invention relating to a configuration in which an OFDM received signal is subjected to OFDM demodulation and demapping, the OFDM modulated signal is subjected to inner deinterleaving by an inner deinterleave circuit, an OFDM decoded signal subjected to inner deinterleaving is further subjected to inner coding and decoding by an inner demodulation circuit the inner coded and decoded signal is subjected to outer deinterleaving by an outer deinterleave circuit, and the inner coded and decoded signal subjected to outer deinterleaving is further subjected to outer coding and decoding by an outer coding and decoding circuit to output a result.

The non-patent document 1 is a paper on the past study in which one of the inventors of the present application joined, and discloses an invention in which modulation and demodulation in space and time are performed using unitary matrixes and a plurality of antennas is used to emit a signal with a time difference.

However, various kinds of communication techniques applicable to the OFDM communication other than the aforementioned techniques have been strongly desired.

The present invention has been made to solve the aforementioned problems and an object of the present invention is to provide a transmitter, receiver, transmitting method, and receiving method that perform efficient communication using modulation and demodulation with a unitary matrix where elements excepting diagonal elements are zero by use of a LDPC code, and program for implementing these on a computer.

DISCLOSURE OF INVENTION

In order to attain the above object, the following will disclose the invention according to the principles of the present invention.

A transmitter according to a first aspect of the present invention includes a coding section, a serial-to-parallel conversion section, a unitary matrix modulation section, a split section; an inverse Fourier transform section, and a transmitting section, and is configured as follows.

More specifically, the coding section receives an input of a transmitting signal and low-density-parity-codes the received signal, and out the coded signal.

Then, the serial-to-parallel conversion section receives an input of the output coded signal, converts the signal from serial to parallel, and outputs m (m≧2) in at signals.

On the other hand, the unitary matrix modulation section modulates the output m intermediate signals to a unitary matrix of m rows and m columns where elements excepting diagonal elements are zero, and outputs an obtained matrix.

Moreover, the split section supplies each of the diagonal elements of the output matrix to each input channel of the inverse Fourier transform section as an input signal.

Then, the inverse Fourier transform section inversely Fourier transforms the input signals supplied to the input channels, and outputs obtained m inversely Fourier transformed signals.

On the other hand, the parallel-to-serial conversion section converts the output m inversely Fourier transformed signals from parallel to serial, and outputs one transmission signal.

Furthermore, the transmitting section transmits the output transmission signal.

Any of frequency differences between the channels of the inverse Fourier transform section is a predetermined coherent bandwidth or more.

A receiver according to another aspect of the preset invention includes a receiving section, a serial-to-parallel conversion section; a Fourier transform section; an inverse split section; a unitary matrix demodulation section; a parallel-to-serial conversion section; and a decoding section, and is configured as follows.

Namely, the receiving section receives a transmitted transmission signal and outputs the signal as a received signal.

On the other hand, the serial-to-parallel conversion section converts the output received signal from serial to parallel, and outputs m (m≧2) intermediate signals.

Moreover, the Fourier transom section Fourier transforms the output m intermediate signal, and outputs obtained m Fourier transformed signals.

Then, the inverse split section supplies the output m Fourier transformed signals to the unitary matrix demodulation section.

On the other hand, the unitary matrix demodulation section demodulates, from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero, and outputs the signals as demodulated signals.

Furthermore, the parallel-to-serial conversion section convert the plurality of modulated signals form parallel to serial, and outputs the signal as a serialized signal.

On the other hand, the decoding section low density-parity-codes the output serialized signal, and outputs the signal as a transmitted signal.

Then, any of frequency differences between channels of the Fourier transform section is a predetermined coherent bandwidth or more.

A transmitting method according to another aspect of the present invention includes a coding step, a serial-to-parallel conversion step, a unitary matrix modulation step, a split step, an inverse Fourier transform step, and a transmitting step, and is configured as follows.

Namely, in the coding step, an input of a transmitting signal is received and the received signal is low-density-parity-coded, and the coded signal is output.

In the serial-to-parallel conversion step, the output coded signal is converted from serial to parallel, and m (m≧2) intermediate signals are output.

On the other hand, in the unitary matrix modulation step, the output m intermediate signals are modulated to a unitary matrix of m rows and m columns where elements excepting diagonal elements are zero, and an obtained matrix is output.

Moreover, in the split step, each of the diagonal elements of the output matrix is supplied to each input channel of the inverse Fourier transform section as an input signal.

Then, in the inverse Fourier transform step, the input signals supplied to the input channels are inversely Fourier transformed, and obtained m inversely Fourier transformed signals are output.

On the other hand, in the parallel-to-serial conversion step, the output m inversely Fourier transformed signals are converted from parallel to serial, and one transmission signal is output.

Furthermore, in the transmitting step, the output transmission signal is transmitted.

Then, any of frequency differences between the channels in the inverse Fourier transform step is a predetermined coherent bandwidth or more.

A receiving method according to another aspect of the present invention includes a receiving step, a serial-to-parallel conversion step, a Fourier transform step, an inverse split step, a unitary matrix demodulation step, a parallel-to-serial conversion step, and a decoding step, and is configured as follows.

Namely, in the receiving step, a transmitted transmission signal is received and the signal is output as a received signal.

On the other hand, in the serial-to-parallel conversion step, the output received signal is converted from serial to parallel, and m (m≧2) intermediate signals are output.

Moreover, in the Fourier transform step, the output m intermediate signals are Fourier transformed, and obtained m Fourier transformed signals are output.

Then, in the inverse split step, the output m Fourier transformed signals are supplied to the unitary matrix demodulation step.

On the other hand, in the unitary matrix demodulation step, from matrixes of m rows and m columns where each of the supplied m Fourier transformed sisals is a diagonal element and elements excepting the diagonal elements are zero, the signals associated with the unitary matrixes of m rows and m columns where elements excepting diagonal elements are zero are demodulated, and the signals are output as demodulated signals.

Furthermore, in the parallel-to-serial conversion step, the plurality of modulated signals is converted from parallel to serial, and the signal is output as a serialized signal.

On the other hand, in the decoding step, the output serialized signal is low-density-parity-coded, and the signal is output as a transmitted signal.

Then, any of frequency differences between channels in the Fourier transform step is a predetermined coherent bandwidth or more.

A transmitter according to another aspect of the present invention includes a coding section, a serial-to-parallel conversion section, a plurality of unitary matrix modulation sections, a split section, an inverse Fourier transform section, a parallel-to-serial conversion section, and a transmitting section.

Namely, the coding section receives an input of a transmitting signal and low-density-parity-codes the received signal, and outputs the coded signal.

Then, the serial-to-parallel conversion section receives an input of the output coded signal and converts the signal from serial to parallel, and outputs m×n (m≧2, n≧1) intermediate signals.

On the other hand, each of the plurality of unitary matrix modulation rations modulates any m of intermediate signals of the output m×n (m≧2, n≧1) intermediate signals without overlaps to a unitary matrix of m rows and m columns where elements excepting diagonal elements are zero, and outputs an obtained matrix.

Moreover, the split section supplies each of the diagonal elements of the output matrix to each input channel of the inverse Fourier transform section as an input signal.

Then, the inverse Fourier transform section inversely Fourier transforms the input signals supplied to the input channels, and outputs obtained m inversely Fourier transformed signals.

On the other hand, the parallel-to-serial conversion section converts the output m inversely Fourier transformed signals from parallel to serial, and outputs one transmission signal.

Furthermore, the transmitting section transmits the output transmission signal.

Then, any of frequency differences between the channels to which the diagonal elements of the matrix are given from the plurality of unitary matrix modulation sections is a predetermined coherent bandwidth or more, among the channels of the inverse Fourier transform section.

Furthermore, in the transmitter of the present invention, the diagonal elements (however, $0 \leq i < n$, $0 \leq j < m$) of j-th row and j-th column of a matrix output from an ith unitary matrix modulation are given to a j×m+i-th input channel of the inverse Fourier transform section, among the plurality of unitary matrix modulation sections.

A receiver according to another aspect of the present invention includes a receiving section, a serial-to-parallel conversion section, a Fourier transform section, an inverse split section, a plurality of unitary matrix demodulation sections, a parallel-to-serial conversion section, and a decoding section, and is configured as follows.

Namely, the receiving section receives a transmitted transmission signal and outputs the signal as a received signal.

On the other hand, the serial-to-parallel conversion section converts the output received signal from serial to parallel, and outputs m×n (m≧2, n≧1) intermediate signals.

Moreover, the Fourier transform section Fourier transforms the output m×n intermediate signals, and outputs obtained m×n Fourier transformed signals.

Then, the inverse split section supplies the output m×n Fourier transformed signals to each of the unitary matrix demodulation sections by n without overlaps.

On the other hand, each of the plurality of unitary matrix demodulation sections demodulates, from matrixes of m rows and m columns where each of the supplied m Fourier transformed signals is a diagonal element and elements excepting the diagonal elements awe zero, the signals associated with the unitary matrixes of m rows and m columns where elements excepting diagonal elements are zero, and outs the signals as demodulated signals.

Moreover, the parallel-to-serial conversion section converts the plurality of modulated signals from parallel to serial, and outputs the signal as a transmitted signal.

On the other hand, the decoding section low-density-parity code the output serialized signal, and outputs the signal as a transmitted signal.

Then, any of frequency differences between the channels, each from which the Fourier transformed signal given to each of the plurality of unitary matrix modulation sections is output is a predetermined coherent bandwidth or more, among the channels of the Fourier transform section.

Furthermore, in the receiver of the present invention, each of the plurality of unitary matrix demodulation sections can be configured to compare each of predetermined plurality of unitary matrixes, which are unitary matrixes of m rows and m columns where elements excepting the diagonal elements are zero, with each of the matrixes of m rows and m columns where each of the supplied m Fourier transformed signals is a diagonal element and elements excepting the diagonal elements are zero, select a matrix having a minimum Euclidean distance among from the predetermined plurality of unitary matrixes, and set the selected matrix as a demodulation result.

Moreover, in the transmitter of the present invention, the diagonal element (however, 0≦i<n, 0≦j<m) of j-th row and j-th column of a matrix compared by an ith unitary matrix demodulation can be configured to be output from a j×m+i-th output channel of the inverse Fourier transform section, among the plurality of unitary matrix demodulation sections.

A program according to another aspect of the present invention is configured to cause a computer to function as the respective sections of the aforementioned transmitter.

A program adding to another aspect of the present invention is configured to cause a computer to function as the respective sections of the aforementioned receiver.

The program of the present invention is executed by a computer connectable to other equipment to make it possible to implement a transmitter, receiver, transmitting method, and receiving method of the present invention.

Moreover, it is possible to distribute and sale an information storage medium on which the program of the present invention is recorded independently of the computer. Furthermore, the program of the present invention can be transmitted, distributed, and sold via the computer communication network such as the Internet.

Particularly, in the case where the computer includes a programmable electronic circuit such as a DPS (Digital Signal Process), FPGA (Field Programmable Gate Array), etc., the program recorded on the information storage medium of the present invention is transmitted to the computer, and executed by DPS or FPGA of the corner, thereby making it possible to use a software radio format that implements the transmitter and receiver of the present invention.

BEST MODE FOR CARRYING OUT THE INVENTION

Although the following will explain the best mode for out the present invention, a description shall be provided of an exemplary embodiment of the invention and other embodiments based on the principles of the present invention may be included in the scope of the present invention.

An explanation will be first given of a unitary matrix used in the present embodiment. Regarding a square matrix S of m rows and m columns (the element of i-th row and j-th column is written as $S_{i,j}$) and its adjoint matrix (transposed conjugate) S* (the element of i-th row and j-ti column is written as $S_{i,j}$*. It should be noted that x* is a conjugate complex number of x.), if S S*=S* S=E is established where E is a it at of m rows and m columns, S is called as "unitary matrix." In the present embodiment, the unitary matrix in which all elements excepting diagonal elements are 0 is used.

For example, the following may be considered as a unitary matrix of two rows and two columns.

$$\begin{pmatrix} 1 & 0 \\ 0 & 1 \end{pmatrix} \quad [\text{Exp. 1}]$$

$$\begin{pmatrix} i & 0 \\ 0 & i \end{pmatrix} \quad [\text{Exp. 2}]$$

$$\begin{pmatrix} -1 & 0 \\ 0 & -1 \end{pmatrix} \quad [\text{Exp. 3}]$$

$$\begin{pmatrix} -i & 0 \\ 0 & -i \end{pmatrix} \quad \text{[Exp. 4]}$$

Regarding which matrix should be selected as a unitary matrix of m rows and m columns in which all elements excepting diagonal elements are 0, the same technique as disclosed in "non-pat document 1" can be used.

In the explanation given below, it is assumed that the above four kinds of unitary matrixes are used for modulation and demodulation. Since $4=2^2$, two bit information is placed in one-to-one correspondence with each other in connection with the respective unitary matrixes.

Accordingly, the following two bit inputs are placed in one-to-one correspondence with each other in each matrix.

$$\begin{pmatrix} 0 \\ 0 \end{pmatrix} \quad \text{[Exp. 5]}$$

$$\begin{pmatrix} 1 \\ 0 \end{pmatrix} \quad \text{[Exp. 6]}$$

$$\begin{pmatrix} 0 \\ 1 \end{pmatrix} \quad \text{[Exp. 7]}$$

$$\begin{pmatrix} 1 \\ 1 \end{pmatrix} \quad \text{[Exp. 8]}$$

The following will explain two-row and two column unitary matrix modulation and demodulation based on these examples. In other words, the unitary matrix is that when two signals (value of each element correspond to one signal) shown by each of [Exp. 5] to [Exp. 8] are input, each matrix, which is shown by each of [Exp. 1] to [Exp. 4] and which is made to correspond to the input, is output as a modulation result, and the unitary matrix demodulation is the inverse of the unitary matrix modulation process.

(Unitary Matrix Modulation as Basics)

Figure 1:
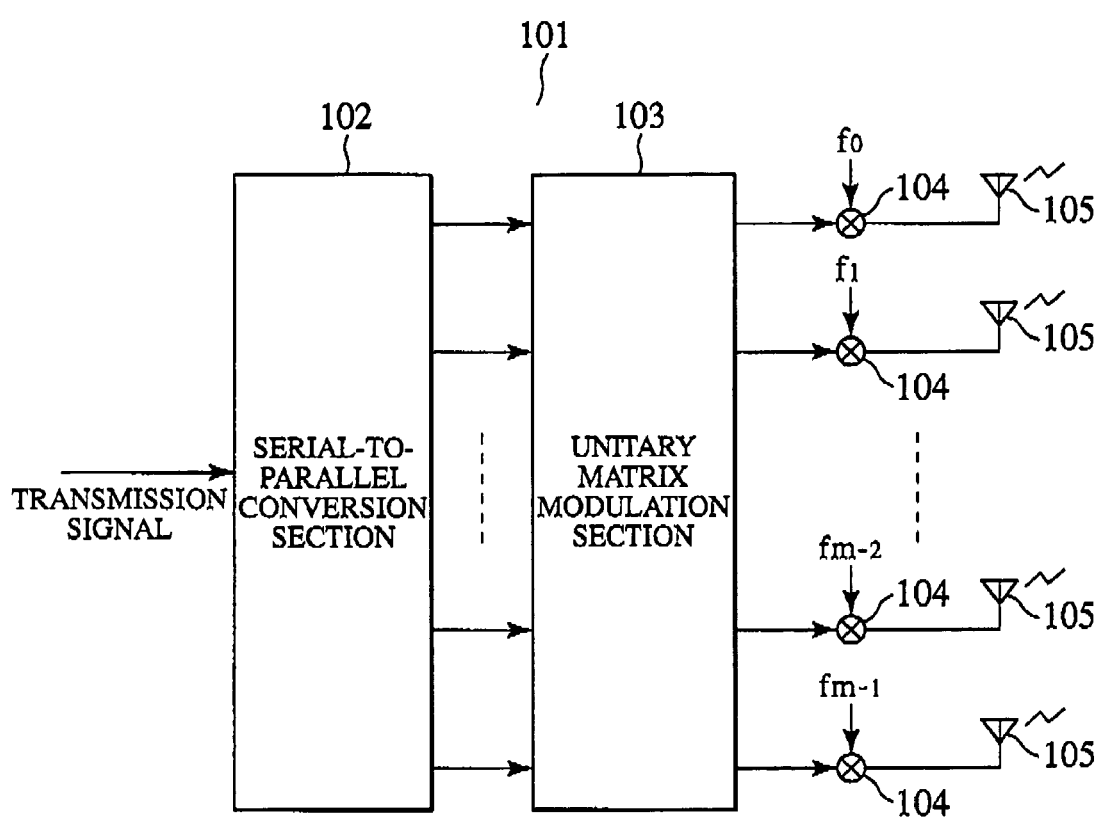
FIG. 1 is a schematic view of a transmitter performs the simplest unitary matrix modulation.

FIG. 1 is a configuration view of a transmitter that performs the simplest unitary matrix modulation. This will be explained with reference to the same figure.

In a transmitter 101, a signal to be transmitted is input to a serial-to-parallel conversion section 102 at an f bit rate per unit time.

The serial-to-parallel conversion section 102 converts from serial to parallel to form two intermediate signals. Accordingly, the output rate of each intermediate signal is f/2 per unit time.

Next, these intermediate signals are supplied to a unitary matrix modulation section 103. Upon reception of two intermediate signals, be unitary matrix modulation section 103 outputs two modulation signals. Then, when input two intermediate signals are viewed as a vertical vector ([Exp. 5] to [Exp. 8]), the unitary matrix modulation section 103 outputs a matrix ([Exp. 1] to [Exp. 4]) corresponding thereto.

For example, when two intermediate si-s are expressed by [Exp. 5] and a matrix to be output is expressed by [Exp. 1], 1, 0 are output to one modulation signal and 0, 1 are output to the other modulation signal in time order, respectively. Accordingly, the output rate of each modulation signal results in per unit time.

After that, each superimposing section 104 superimposes each modulation signal on a carrier wave with a different carrier frequency. Here, a value of each element of the unitary matrix is generally a complex number ad a phase of a superimposition result changes. Then each signal is output from each antenna 105.

As mentioned above, the unity matrix output from the unitary matrix modulation section 105 has all zero excepting diagonal elements. Accordingly, in the above embodiment when a signal is output from any one of the antennas 105 (transmission power is non-zero), no signal is output from any of the other antennas 105 (transmission power is zero). As mentioned above, one signal is transmitted by being developed along each of a time axis and a spatial axis.

Here, by use of the point that signals are exclusively transmitted from the antennas 105, that is, diagonal elements of unitary matrix output from the unitary matrix modulation section 103 are all zero, compression along the time axis will be assumed. Moreover, in the embodiment shown in FIG. 1, it is assumed that the number of antennas 105 may be one although the number of antennas 105, which is equivalent to the number of dimensions of the unitary matrix, is needed. For this mason, the applied technique is an OFDM technique.

(Embodiment of Transmitter)

Figure 2:
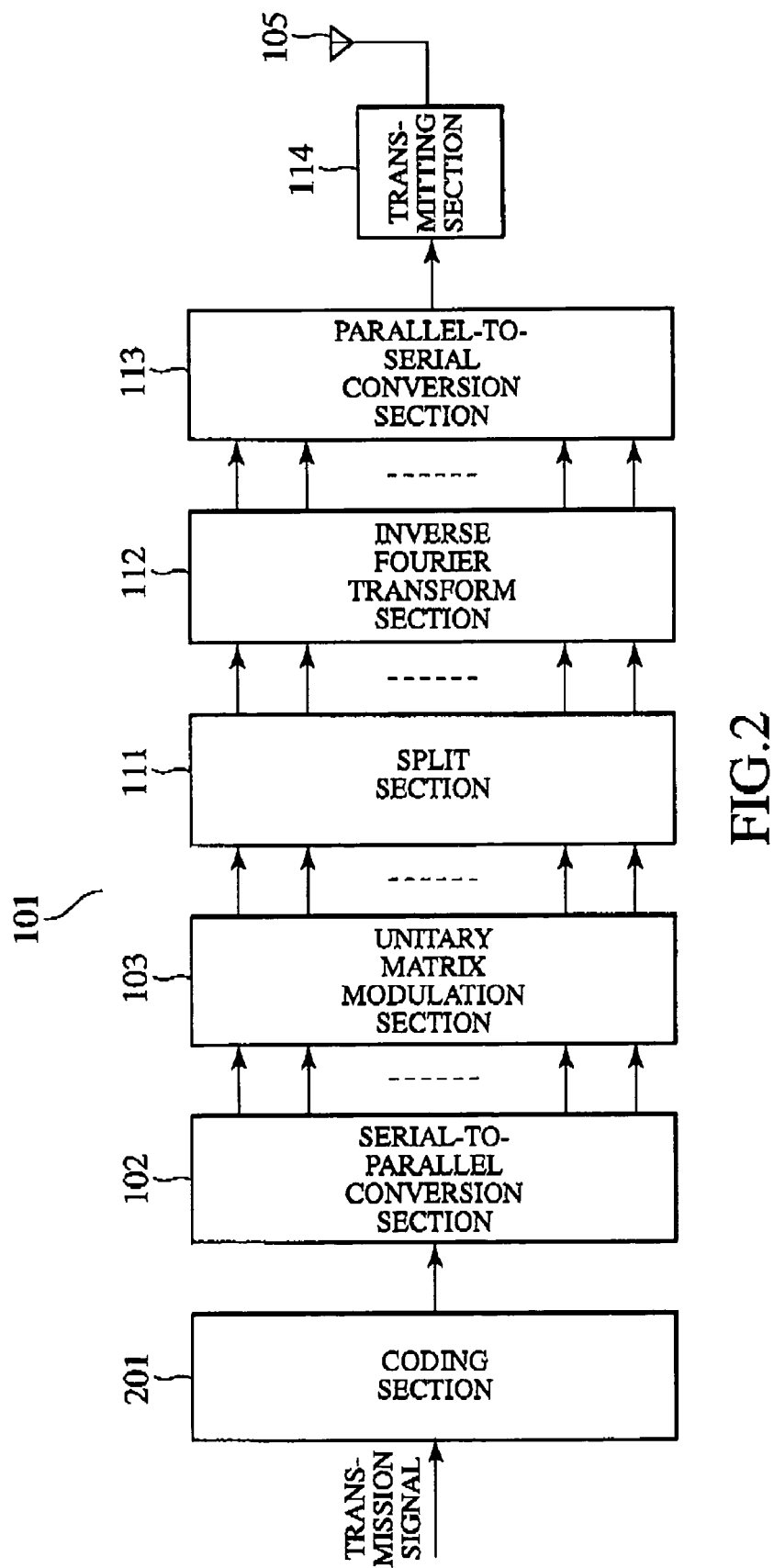
FIG. 2 is a schematic view illustrating an outline configuration of a transmitter in which an LDPC code, OFDM technique and unitary matrix modulation are combined.

FIG. 2 illustrates an outline configuration of a transmitter in which the OFDM technique and the unitary matrix modulation are combined.

First, the transmitter 101 is different from that illustrated in FIG. 1 in the point that a coding section 201 LDPC-codes a transmitting signal and outputs the signal as a coded signal. Details on the LDPC code will be given later.

Next processing of the serial-to-parallel conversion section 102 and that of the unitary matrix modulation section 103 are the same as those of the embodiment shown in FIG. 1.

In other words, when the coded signal is input to the serial-to-parallel conversion section 102, the serial-to-parallel conversion section 102 converts the input signal from serial to parallel to form two intermediate signals.

Next, these intermediate signals are supplied to the unitary matrix modulation section 103. Upon reception of two intermediate signals, the unitary matrix modulation section 103 outputs two modulation signs. Ten, when input two intermediate signal are viewed as a vertical vector ([Exp. 5] to [Exp. 8]), the unitary matrix modulation section 103 outputs a matrix ([Exp. 1] to [Exp. 4]) corresponding thereto.

For example, when two intermediate signals are expressed by [Exp. 6] and a matrix to be output is expressed by [Exp. 2], i, 0 are output to one modulation signal and 0, i are output to the other modulation signal in time order, respectively.

Then, a split section 111 inputs combinations (consistency with the number of dimensions) of real parts and imaginary parts of these signals output from the unitary matrix modulation section 103 to combinations (I channel and Q channel) of real parts of and imaginary parts of an inverse Fourier transform section 112 to carry out inverse Fourier transform.

Figure 3:
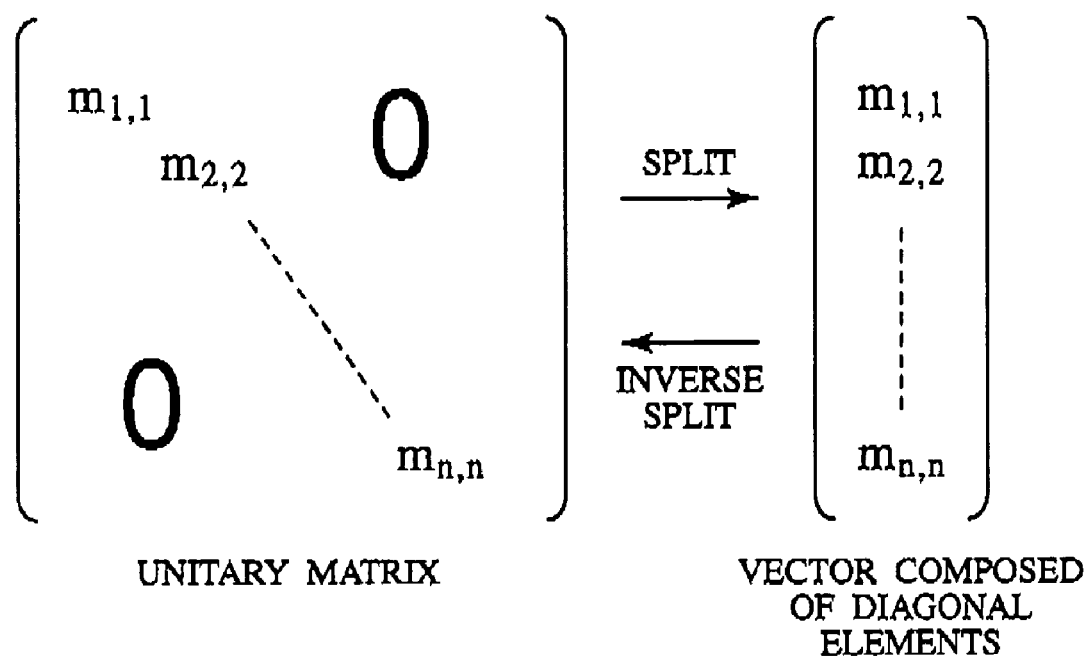
FIG. 3 is an explanatory view showing an explanation of split processing.

FIG. 3 illustrates an explanation of processing of the split section 111. The split section 111 outputs values of elements of i row and i column of matrix in connection with an ith signal. In other words, in the above example, the split section 111 outputs [Exp. 9].

$$\begin{pmatrix} i \\ i \end{pmatrix} \quad \text{[Exp. 9]}$$

Since elements excepting the elements (diagonal elements) of i row and i column are all zero, no information is lost even if such processing is performed. Additionally, the split section may further perform exchange of the respective outputs. After sprint processing, the result is supplied to the inverse Fourier transform section 112.

Additionally, it is possible to use such an embodiment in which the unitary matrix modulation section 103 outputs not the unitary matrix itself but only diagonal elements of the unitary matrix. In this case, when the split section 111 does not perform exchange of the respective outputs, the split section 111 is not needed, and the output of the unitary matrix modulation section 103 is directly supplied to the inverse Fourier transform section 112. In this example, vectors of the following [Exp. 10] to [Exp. 13] are used in place of the matrixes of [Exp. 1] to [Exp. 4].

$$\begin{pmatrix} 1 \\ 1 \end{pmatrix}$$ [Exp. 10]

$$\begin{pmatrix} i \\ i \end{pmatrix}$$ [Exp. 11]

$$\begin{pmatrix} -1 \\ -1 \end{pmatrix}$$ [Exp. 12]

$$\begin{pmatrix} -i \\ -i \end{pmatrix}$$ [Exp. 13]

The inverse Fourier transform section 112 inversely Fourier transforms the input signal group in the same way as the general OFDM communication. It is desirable that a frequency difference between the channels (subcarriers of OFDM communication) of inverse Fourier transform carried out by the inverse Fourier transform section 112 be a predetermined coherent hand width or more. The coherent bandwidth is a frequency difference be the channels whose channel responses due to a delay wave are similar to each other; namely, and the longer delay time of the delay wave, the narrower the coherent bandwidth of the channel, and the shorter delay time of the delay wave, the wider the coherent bandwidth of the channel, Here, for example, on the assumption of the OFDM system having the bandwidth of 80 MHz and 128 subcarriers, the subcarrier bandwidth results in $\Delta f = 80$ MHz/$128 = 625$ kHz. Here, if it is assumed that RMS (Root Mead Squared) delay spread is $\tau = 714$ ns, the cohere bandwidth is BC=$1/(50\tau)=28$ kHz$\approx 0.048\Delta f$. In the equation, a constant 50 is a calculation coefficient, which is a constant that is similar to a so-called safety factor.

Accordingly, in such a case, the frequency difference between the adjacent channels (subcarriers) is sufficiently larger than the coherent bandwidth. If the size of the RMS delay spread is obtained based on a situation of a propagation path and a situation of a frequency band to be used, it is possible to obtain a coherent bandwidth therefrom.

When inverse Fourier transform is completed, a parallel to serial conversion section 113 converts the output signals from parallel to serial to form one signal, and a transmitting section 114 transmits the resultant signal from one antenna 105. This stage is similar to the general OFDM transmission.

(Embodiment of Receiver)

Figure 4:
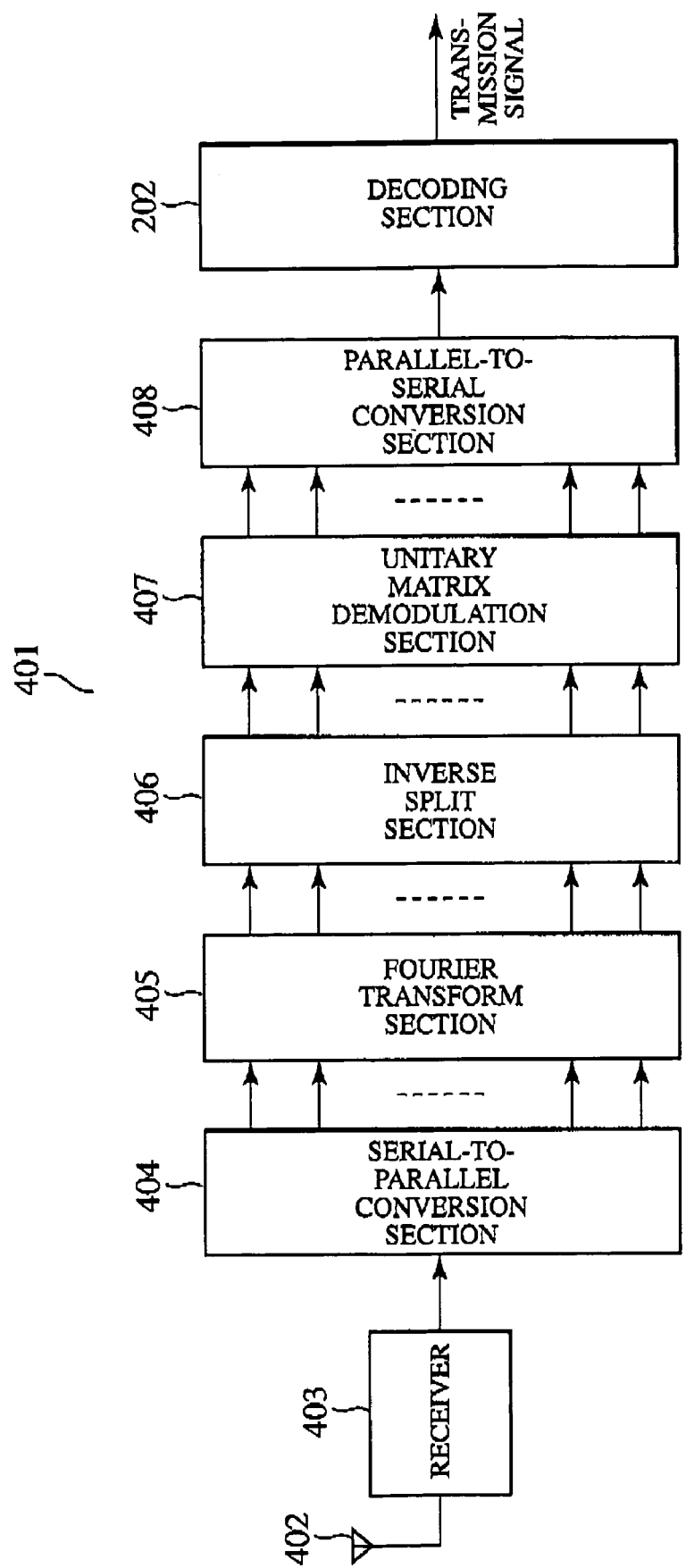
FIG. 4 is a schematic view illustrating an outline configuration of a receiver to be paired with the transmitter illustrated in FIG. 2.

FIG. 4 is a schematic view illustrating an outline configuration of a receiver to be paired with the transmitter 101 shown in FIG. 2. This will be explained with reference to the same figure.

A receiving section 403 of a receiver 401 receives the signal transmitted from the transmitter 101 via an antenna 402. Next a serial to parallel conversion section 404 converts the received signal from serial to parallel and outputs two intermediate signal. A value "2" is based on the fact that the unitary matrix modulation used in the transmitter 101 employs the unitary matrix of two rows and two columns, and when the unitary matrix of m rows and m columns is used, m intermediate signals are output.

Then, a Fourier norm section 405 Fourier transforms the intermediate signals and outputs two Fourier transformed signals, similar to the gal OFDM communication. The Fourier transform section 405 is paired it the inverse Fourier transform section 111 of the transmitter 101, and the frequency difference (bandwidths of the respective chapels (subcarriers)) between the respective channels (subcarrier) is se to be the coherent bandwidth or more.

If no various influences were exerted on a radio propagation path, a signal to be output here should be proportional to any of [Exp. 10] to [Exp. 13]; however, in actual, there is caused a difference between each signal and each expression by influences of the radio propagation path.

For this reason, an inverse split section 406 determines to which of [Exp. 10] to [Exp. 13] the Fourier transformed signal comes closest and obtains a vector which is determined as the closest expression. Although "nearness" is typically decided by Euclidean distance between vectors, it is possible to use various "distance" calculation methods such as a sum total of absolute values of the differences in the respective vector elements.

Then, unitary matrix having the respective elements of the obtained vectors as diagonal elements can be acquired by the "inverse split" which is opposite to the split shown in FIG. 3.

A unitary matrix demodulation section 407 outputs vectors [Exp. 1] to [Exp. 4]) which are made to correspond to the unitary matrixes ([Exp. 5] to [Exp. 8] in the above-mentioned example) output by the inverse split section in advance.

Moreover, a parallel-to-serial conversion section 408 converts the vectors output by the unitary matrix demodulation section 407 from parallel to serial and outputs the resultant signal.

Finally, a demodulation section 202 LDPC-decodes the parallel-to-serial converted signal and outputs the result as are signal. The details on the LDPC code will be described later.

In addition, the existent electronic device circuit for a fast Fourier transform can be used as the inverse Fourier transform section 112 and the Fourier transform section 405, in which case the bandwidth of each channel (subcarrier) is fixed in many cases. Then, in the case where the bandwidth is narrower an the above-obtained coherent bandwidth, the frequency difference between the frequency bands of the respective channels can be increased by skips some channels.

(Other Embodiment)

Figure 5:
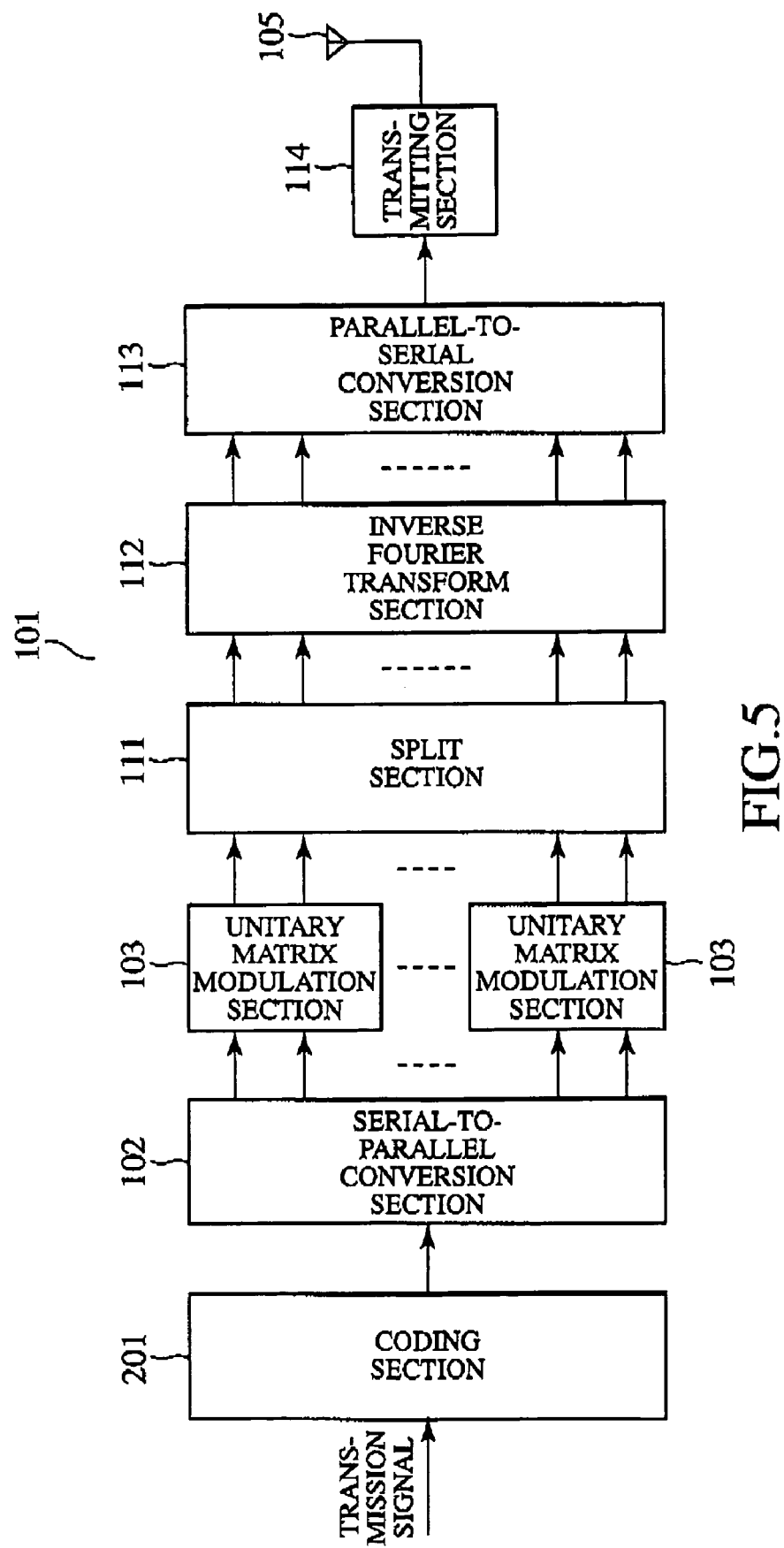
FIG. 5 is a schematic view illustrating an outline configuration of a transmitter according to another embodiment of the present invention.
Figure 6:
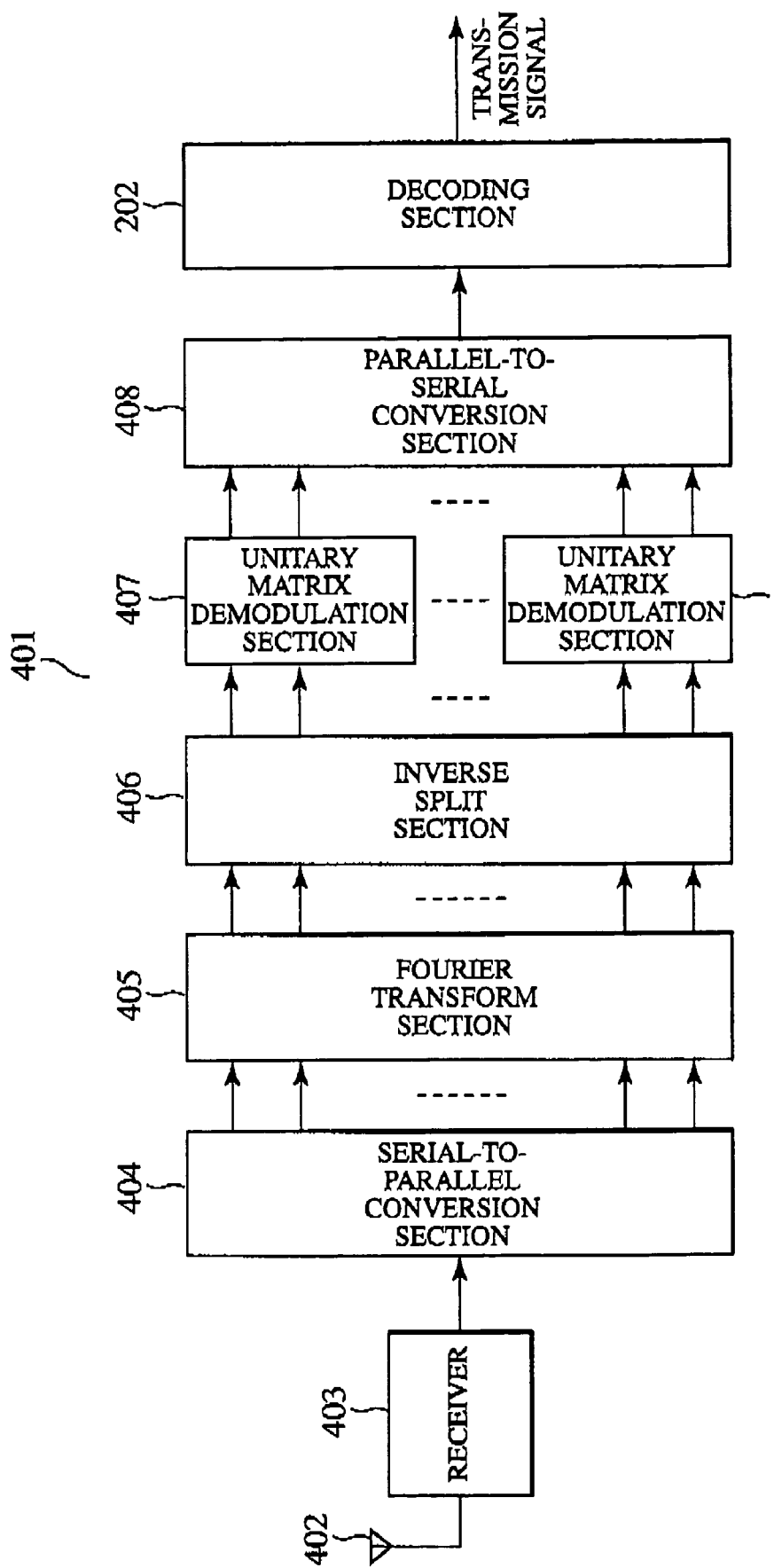
FIG. 6 is a schematic view illustrating an outline configuration of a receiver according to another embodiment of the present invention.

In the above embodiment only one unitary matrix modulation section and one unity matrix are respectively used to carry out modulation and demodulation; however, in the present invention, n unitary matrix modulation sections of m-row and m column and n unitary matrix demodulation sections are respectively used and m×n channels are used in OFDM. Typically, supposed that m=2 is used as described in the above embodiment, FIGS. 5 and 6 art explanatory views illustrating an outline configuration of the transmitter of the present embodiment and an outline configuration of the receiver, respectively, and the same reference numerals as those of the aforementioned embodiment are added to the same components as those of the aforementioned embodiment.

In the transmitter 101, the coding section 201 receives the input of the transmitting signal and LPDC-codes the signal. Details on the LDPC-coding will be described later.

The serial-to-parallel conversion section 102 receives the input of the LDPC-coded signal and converts the received signal from serial to parallel, and outputs m×n (m≧2, n≧1) intermediate signals. It is assumed that the intermediate signals area $a_0, a_1, \ldots, a_{m \times n-1}$, in order.

On the other hand, each of the multiple unitary modulation sections 103 modulates any m of the output m×n intermediate signals to unitary matrixes of m rows and m columns in which all elements excepting diagonal elements are 0, and outputs an obtained matrix.

When numbers 0 to n−1 are assigned to the unitary matrix modulation sections 103, respectively, intermediate signals $a_{l \times m}, a_{l \times m+1}, \ldots, a_{l \times m+m-1}$ are given to an ith unitary matrix modulation section 103.

In order to make it easy to understand the invention, the diagonal elements of j rows and j columns of the matrix that the ith unitary matrix modulation section 103 outputs are hereinafter written as $r_{i,j}$.

Moreover, the split section 104 supplies the reeve output diagonal elements of the m to input channels of the inverse Fourier transform section 105 to server input signals. In this case, the diagonal elements $r_{i,0}, r_{i,1}, \ldots, r_{i,m-1}, \ldots$, which are output from the same unitary matrix modulation section 103, are desirably supplied to the input channels whose frequencies are placed as far as possible. Also, in this case, the frequency difference is set to be the coherent bandwidth or more.

This condition is more lenient than the aforementioned embodiment. That is, in the aforementioned embodiment the frequency difference, which is equal or more than the coherent bandwidth, is required for all combinations of input channels; however, in the present embodiment, regarding the input channels to which the diagonal elements output from the same unitary modulation section 103 are given, it is sufficient that the frequency difference will be the coherent bandwidth or more.

The reason why such setting is possible is that the channel responses are similar to each other in connection with the signals (diagonal elements) output from the same unitary matrix modulation section 103.

It is of course that a large frequency difference among all input channels is also desirable as measurements against the delay wave in the pot embodiment; however, these values can be appropriately set according to the application field since a trade-off relationship with the performance exists.

Figure 7A:
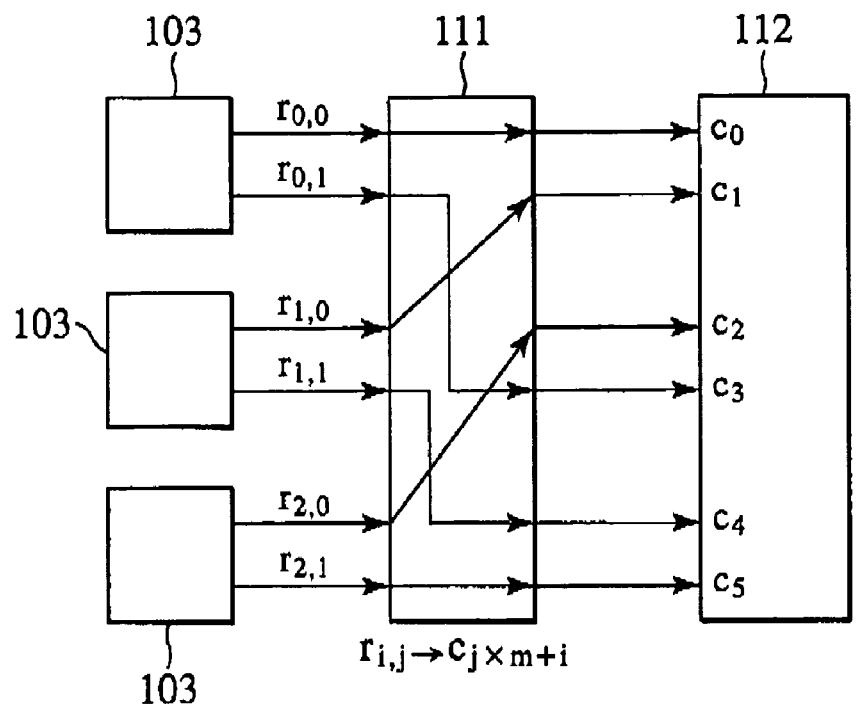
FIG. 7 is a schematic view illustrating an outline configuration of split process according to another embodiment of the present invention.

Accordingly, it is assumed that the input channels of the inverse Fourier transform section 105 are named as $c_0, c_1, c_{m \times n-1}$, in order of the frequency. In order to supply the diagonal elements $r_{i,0}, r_{i,1}, \ldots, r_{i,m-1}, \ldots$, which are output from the same unitary matrix modulation section 103, to the input channels whose frequencies are placed as far as possible, the diagonal elements $r_{ij}$ may be supplied to the input channels $c_{j \times m+i}$. The aforementioned signal supply method is shown by FIG. 7A.

Figure 7B:
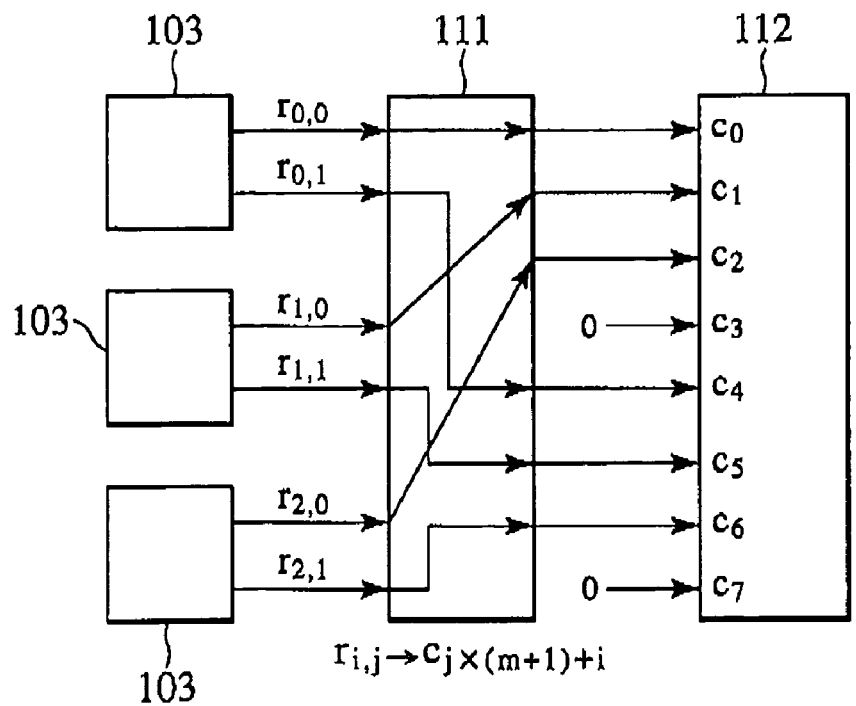

Additionally, in connection with a predetermined constant k which is 1 or more, the diagonal elements $r_{ij}$ may be supplied to the input channels $c_{j \times (m+k)+i}$. This state is shown by FIG. 7B. In this case, since no output of the unitary mat modulation section 105 is supplied to some input channels (channels corresponding to $c_{j \times (m+k)+1+1}$ to $c_{j \times (m+k)+1+k-1}$) among the input channels of the inverse Fourier transform section 105, a value 0 is typically supplied thereto. However, known signals are supplied to some input channels, so that the relevant channels may be used for transmitting pilot signals. In this case, the receiver 401 can add processing such as various kinds of signal compensation by acquiring synchronization.

Then, the inverse Fourier transform section 105 inversely Fourier transforms multiple input signals supplied to the input channels and outputs the obtained multiple inversely Fourier transformed signals.

On the other hand, the parallel-to-serial conversion section 106 converts the output inversely Fourier transformed signals form parallel to serial and outputs one transmission signal.

Moreover, a transmission section 107 transmits the output transmission signal. On the other and, the receiver 401 corresponding to the transmitter 101 includes a receiving section 403, a serial-to-parallel conversion section 404, a Fourier transform section 405, an inverse split section 406, a plurality of unitary matrix modulation sections 407, a parallel-to-serial conversion section 408, and a decoding section 202, and is configured as follows.

The receiving section 403 receives the transmitted transmission signal via the antenna 402 and output the signal as a received signal, On the other hand, the serial-to-parallel conversion section 404 converts the output received signal from serial to parallel and outputs m×n (m≧2, n≧1) intermediate signals.

Furthermore, the Fourier transform section 405 Fourier transforms the output m×n intermediate signals and outputs the obtained m×n Fourier transformed signals.

Then, the inverse section 406 supplies the output m×n Fourier transformed signals to the unitary matrix demodulation sections 407 by n without overlaps, respectively. This correspondence relationship has an inverse relation to that of the transmitter 101. In the case of the example shown in FIG. 7, each arrow, which represents a direction where the signal is supplied, is tuned in the opposite diction, resulting in inverse split processing.

On the other hand, each of the multiple unitary matrix demodulation sections 407 demodulates the unitary matrix of m rows and m columns where elements excepting the diagonal elements are zero from the matrixes of m rows and m columns where the respective supplied Fourier transformed signals are the diagonal elements and elements except the diagonal elements are zero. Namely, similar to the aforementioned embodiment there is selected one having a minimum Euclidean distance between "a predetermined unitary matrix" and "a matrix of m rows and m columns where the reeve Fourier transformed signals are the diagonal elements and elements excepting the diagonal elements are zero", namely, one having a minimum Euclidean distance between "a vector composed of diagonal elements of the predetermined unitary matrix" and "a vector having each of the Fourier transformed signals as an element", and a signal corresponding thereto is output as a demodulated signal.

For example, when the following [Exp. 14] is the "matrix of m rows and m columns where the respective Fourier transformed signals are the diagonal elements and elements excepting the diagonal elements are zero", the unitary matrix represented by [Exp. 1] is the closest to this in terms of the Euclidean distance among [Exp. 1] to [Exp. 4], so that the demodulated signal results in [Exp. 5].

$$\begin{pmatrix} 0.8 & 0 \\ 0 & 0.9 \end{pmatrix} \qquad \text{[Exp. 14]}$$

In addition it is possible to perform an appropriate normalization of "the matrix of m rows and m columns where the respective Fourier transformed signals are the diagonal elements and elements excepting the diagonal elements are zero" before obtaining the Euclidean distance. For instance, a method such as division of each diagonal element by "mean square of diagonal element" can be considered. In this case, calculation of the normalized matrix corresponding to [Exp. 14] results in the following [Exp. 15] since the means square of diagonal element is 0.85147.

$$\begin{pmatrix} 0.93955 & 0 \\ 0 & 1.05700 \end{pmatrix}$$ [Exp. 15]

Moreover, the parallel-to-serial conversion section 407 converts the demodulated signals from parallel to serial, and the decoding section 202 LDPC decodes the converted signal and outputs the signal as a transmitted signal.

Regarding the selection of the unitary matrix where elements excepting the diagonal elements are zero and the correspondence therebetween in the transport 101 and the receiver 401, specifically, about each of the pair of the unitary matrix demodulation sections 407 corresponding to the unitary matrix modulation sections 103, the same matrix and correspondence may be selected or different matrix and correspondence may be selected. Particularly, in connection with "the unitary matrix demodulation sections 407 corresponding to the adjacent unitary matrix modulation sections 103", selection of different unitary matrix and correspondence may be used.

Regarding the input channels to which the diagonal elements output from the same unitary mat modulation section are given as mentioned above, if LDPC-coding and -decoding are not used, it is required the frequency difference be the coherent bandwidth or more. If the LDPC code is used, it is possible to make the bandwidth narrower. The following will specifically explain processing of LDPC code.

(LDPC Code)

The LDPC code is a code which is known as one having performance that is extremely close to Shannon limit.

Figure 8:
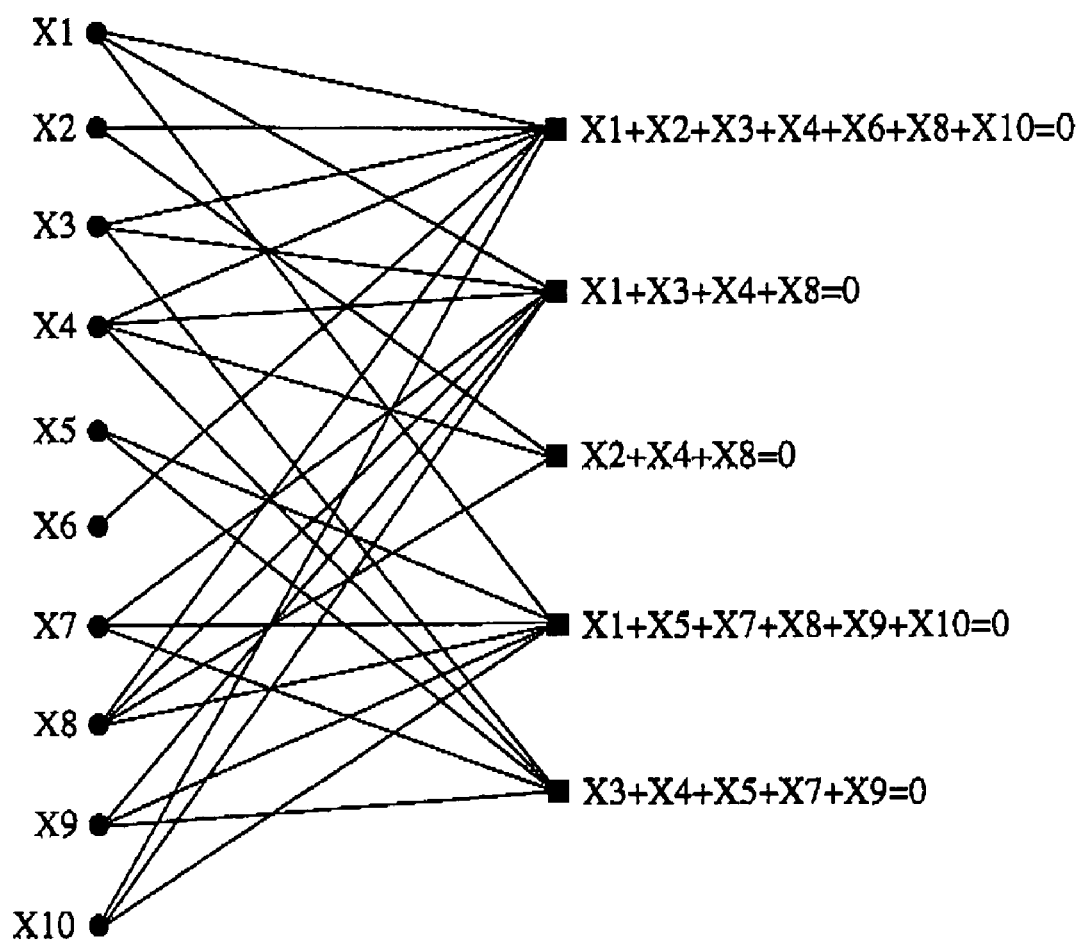
FIG. 8 is an explanatory view showing an example of a graph corresponding to an LDPC code.

The LDPC code is a linear code, which can be obtained from a sparse bipartite graph. FIG. 8 is an explanatory view illustrating an example of such the graph.

As illustrated in this figure, n nodes (herein after referred to as "message nodes") are shown at the left side of the graph and r nodes (herein referred to as "check nodes" are shown at the right side thereof.

It is possible to obtain a linear code where a block length is n and dimension is at leas n−r from this graph by the following procedure.

That is, on a portion of code words $(c_1, c_2, \ldots c_n)$ composed of n elements, each is assigned to the message node. It is noted that any of $c_1, c_2, \ldots, c_n$ takes value 0 for 1.

Next, although the message node and the check node are connected to each other, the total number of code words assigned to the message nodes connected to a certain check node (additions of 0+0=1+1=0, 0+1=1+0=1 are used) is designed to be zero. Although there are several ways of connection, the way of connection is selected as described later.

The graph thus made can be expressed by an adjacency matrix. Namely, a matrix H is a binary matrix of n rows and r columns (matrix where value of each element 0 or 1), and when an ith check node an a jth message node are coated in the graph, the element of j row and i column is 1, and the elements become zero in the other cases. Accordingly, this matrix H can be expressed byte following [Exp. 16]

$$H = \begin{pmatrix} 1 & 1 & 1 & 1 & 0 & 1 & 0 & 1 & 0 & 1 \\ 1 & 0 & 1 & 1 & 0 & 0 & 0 & 1 & 0 & 0 \\ 0 & 1 & 0 & 1 & 0 & 0 & 0 & 1 & 0 & 0 \\ 1 & 0 & 0 & 0 & 1 & 0 & 1 & 1 & 1 & 1 \\ 0 & 0 & 1 & 1 & 1 & 0 & 1 & 0 & 1 & 0 \end{pmatrix}$$ [Exp. 16]

Since code words $c=(c_1, c_2, \ldots, c_n,$ are associated with $X_1, X_2, \ldots, X_{10}$, the following equation is established in consideration of a matrix product and transposition $$Hc^T=0.$$

This matrix H is called a parity check matrix with respect to the code word C.

The LDPC code refers to one which is sparse (the rate of the number of elements having a value of 0 is high) among the parity check matrixes composed of the code words. Accordingly, obtaining the matrix H (where elements are arranged in one line) from the code words $c=(c_1, c_2, c_n)$ results in LDPC coding.

Figure 9:
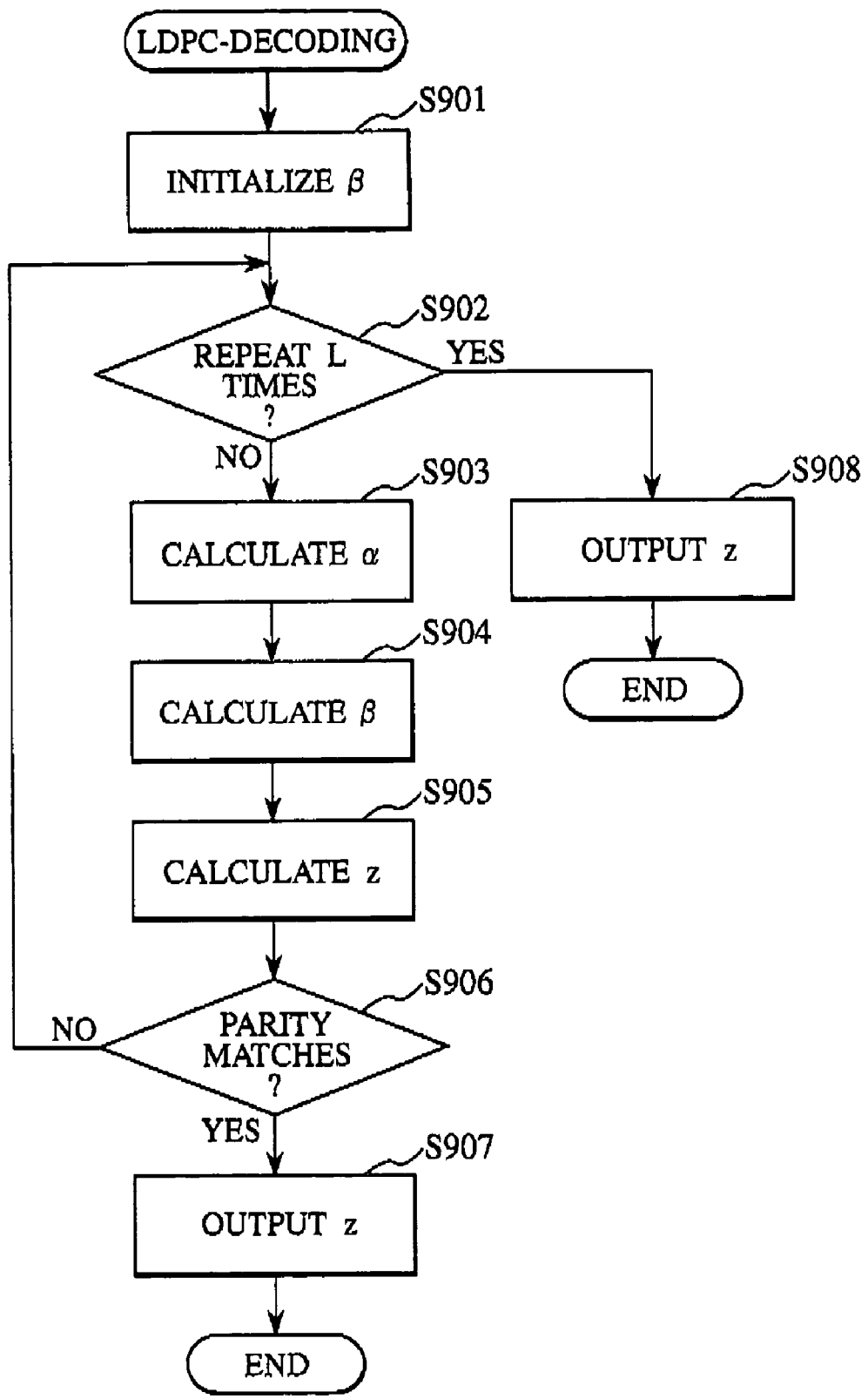
FIG. 9 is a flowchart illustrating a flaw of control of for LDPC-coding in the receiver.

The processing for acquiring the original code words c from the thus obtained matrix H is LDPC-decoding. The following will explain the details on the decode processing FIG. 9 is a flow chart illustrating the flow of control of LDPC-decoding. The following will give an explanation with reference to this figure.

It is assumed that the number where 1 appears in each column is t in the parity check matrix H of n rows and r columns. This parity check matrix is called "(r, n, t) LDPC code."

In the case of t>2, there exists at east one (r, n, t) LDPC code such that the minimum distance of the LDPC code is increased in proportional to a block length n.

Accordingly, in consideration of an increase in time required for decode processing and complexity of decode processing at the time of practical use, there is a limitation in increasing a code length; however, a high code gain can be obtained if the code length is increased The rate at which the maximum distance is increased is decided by the number of elements, which are non-zero, that is, this is decided by a value obtained by dividing t by n.

The following will explain the details on process for decoding the LDPC code using a sum-product algorithm.

First, λi, which is defined as follows, is assumed with respect to $1 \leq i \leq n$.

$$\lambda i = 1n\{\omega(y_i|0)\omega(y_i|1)\}$$

In an ith row of the LDPC codes, the rte at which 0 appears is $\omega(y_i|0)$ and the rate which 1 appears is $\omega(y_i|1)\}$. Since its natural logarithm is used, λi is a value relating to entropy.

This λi is called "local LLR." The reason why this is called "local LLR" is that λi is defined by an ith received symbol. In other words, each row is regarded as a symbol to be transmitted and the relevant symbols arranged in serial from the first to nth row, so that the matrix H is coded.

Since the following processing is carried out by use of the computer, mixtures α, β, which are temporarily used, and z, which stores a decoding result, are stored in a memory such as RAM, in addition to the parity check matrix H. Accordingly, in order to make it easy to understand the invention, elements of j rows and i columns ($1 \leq j \leq r$, $1 \leq i \leq n$) are assumed to be expressed in, for example, H[j,i].

Moreover, the following sets are assumed.

$$A(j)=\{i|H[j,i]=1\}$$

$$B(j)=\{j|H[j,i]=1\}$$

The following will explain the details on processing. When the processing is started, 0 is stored for β[j,i] in connection with all combinations of j, i that satisfy H[j,i]=1. For other elements of β, appropriate initial values such as 1, −1 are stored (step S901).

Next, processing in the following steps S903 to S906 is repeated L times (step 8902).

Namely, in connection with all combinations of j, i that satisfy H[j,i]=1, [Exp. 17] is calculated and the calculated value is stored for α[j,i] (step S903).

$$\prod_{i' \in \lambda(j) \backslash i} \text{sign}(\lambda_{i'} + \beta[j, i']) \times f\left(\sum_{i' \in \lambda(j) \backslash i} f(|\lambda'_i + \beta[j, i']|)\right) \quad [\text{Exp. 17}]$$

Here, a backward slash mark means "a set in which right-side elements are removed from the left-side set of the backward slash." Accordingly, in the case of [Exp. 17], i≠i is established.

However, if x is 0 or more, sign(x) is a function of 1, and if not, sign(x) is a function of 0, and f(x) is defined as in Exp. 18.

$$f(x) = \ln\frac{e^x + 1}{e^x - 1} \quad [\text{Exp. 18}]$$

Moreover, in connection with all combinations of j, i at satisfy H[j,i]=1, [Exp. 19] is calculated and the calculated value is stored for β[j,i] (step S904).

$$\sum_{j' \in B(i) \backslash j} \alpha[j', i] \quad [\text{Exp. 19}]$$

Furthermore, in connection with each i of 1≧i≧n, [Exp. 20] is calculated and if each value of a calculation result is 0 or more (if the value is 1 when the sign is taken), 0 is stored for z[j,i] and if not, 1 is stored for [i] (step S905).

$$\lambda_i + \sum_{j' \in B(i)} \alpha[j', i] \quad [\text{Exp. 20}]$$

Moreover, the parity of z is checked (step S906). More specifically, in the matrix H, $Hz^T$ where a vector z is transposed is calculated to check whether the result matches a 0-vector.

When the parity of z matches (step S906: Yes), the obtained z is output as a decoding result (step S907) and the present processing is finished.

On the other hand, when the parity does not match, the processing goes bark to step 902 (step S906: No).

When L-time repetitions are finished (step S902: Yes), z obtained at this time is output as a decoding result (step S908) and the present processing is finished.

(Experimental Result)

Figure 10:
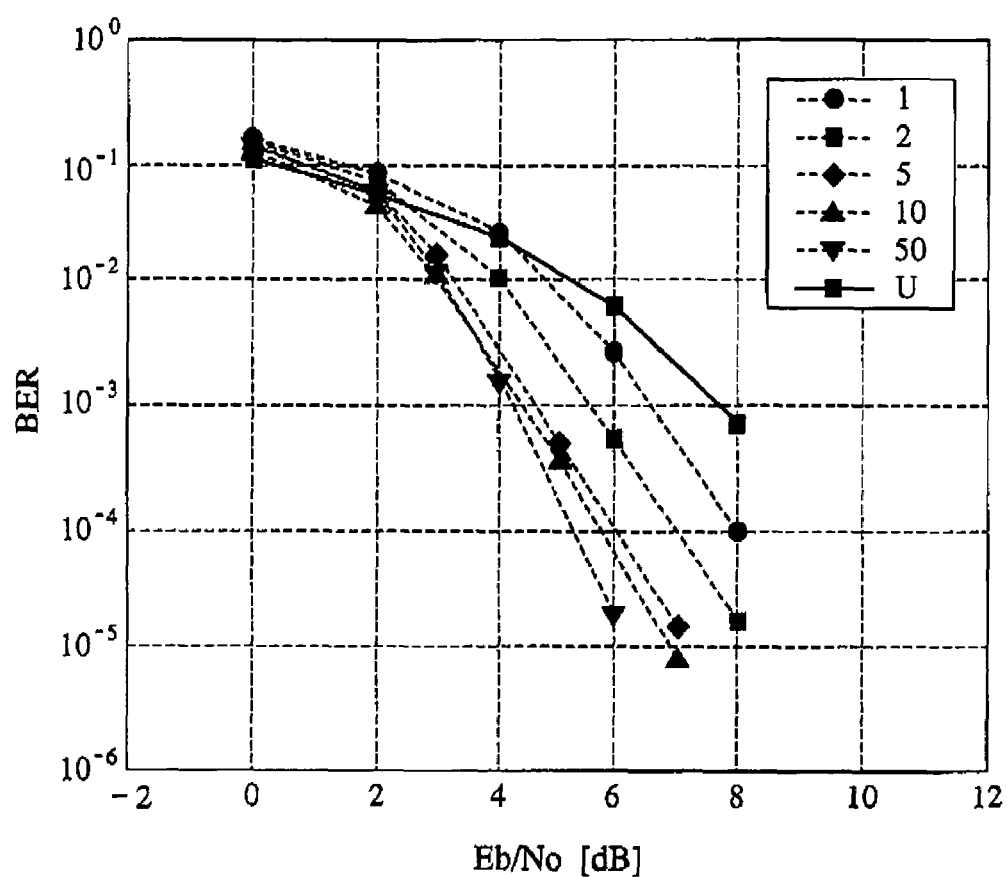
FIG. 10 is a graph illustrating an experimental result.

FIG. 10 is a graph showing a result of checking performance of the present system by a computer simulation based on the following conditions. In the present graph, a transverse axis indicates Eb/No, a vertical axis indict a BER (Bit Error Rate), the number of repetitions L of steps S902 to 906 at the receiving side is 1, 2, 50, 10, and 50, respectively, and a rest of a case (U) in which no LDPC-coding is performed.

In the present computer simulation, the performance is obtained under environment where (128, 64, 7) LDPC codes are used, the number of subcarriers is 128, be diagonal elements are split to the coherent bandwidth or more, and Doppler frequency is 10 Hz As is obvious from the present graph, when the number of repetitions L is one to two, there are some sections where performance is reduced as compared with the case in which no LDPC-coding is performed; however, when repetition is performed five times or more, performance is improved in almost all sections as compared with the case in which no LDPC-coding is performed. Moreover, although the increase m the number of repetitions L reduces BER to improve performance, it is shown that degree of improvement in performance declines when the number of repetitions is increased.

The technique of so radio is used to install software to various kinds of computers, FPGA (Field Programmable Gate Array) and DSP (Digital Signal Processor), thereby making it possible to implement these transmitters and receivers.

INDUSTRIAL APPLICABILITY

According to the present invention, it is possible to provide transmitter, receiver, transmitting method, and receiving method that perform efficient communication using modulation and demodulation with the unitary matrix were elements excepting the diagonal elements are zero, and program for implementing these on a computer.

The invention claimed is

1. A transmitter comprising:
a coding section:
a serial-to-parallel conversion section;
a unitary matrix modulation section;
a split section;
an inverse Fourier transform section; and
a transmitting section,
wherein the coding section receives an input of a transmitting signal and low-density-parity-codes the received signal, and outputs the coded signal;
wherein the serial-to-parallel conversion section converts the output coded signal from serial to parallel, and outputs m (m≧2) intermediate signals;
wherein the unitary matrix modulation section modulates the output m intermediate signals to a unitary matrix of m rows and m columns where elements excepting diagonal elements are zero, and outputs an obtained matrix;
wherein the split section supplies each of the diagonal elements of the output matrix to each input channel of the inverse Fourier transform section as an input signal;
wherein the inverse Fourier transform section inversely Fourier transforms the input signals supplied to the input channels, and outputs obtained m inversely Fourier transformed signals;
wherein the parallel-to-serial conversion section converts the output m inversely Fourier transformed signals from parallel to serial, and outputs one transmission signal;
wherein the transmitting section transmits the output transmission signal; and wherein any of frequency differences between the channels of the inverse Fourier transform section is a predetermined coherent bandwidth or more.

2. A receiver comprising:
a receiving section;
a serial-to-parallel conversion section;
a Fourier transform section;
an inverse split section;
a unitary matrix demodulation section;
a parallel-to-serial conversion section; and
a decoding section,
wherein the receiving section receives a transmitted transmission signal and outputs the signal as a received signal;
wherein the serial-to-parallel conversion section converts the output received signal from serial to parallel, and outputs m (m≧2) intermediate signals;
wherein the Fourier transform section Fourier transforms the output m intermediate signals, and outputs obtained m Fourier transformed signals;
wherein the inverse split section supplies the output m Fourier transformed signals to the unitary matrix demodulation section;
wherein the unitary matrix demodulation section demodulates, from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero, and outputs the signals as demodulated signals;
wherein the parallel-to-serial conversion section converts the plurality of modulated signals from parallel to serial, and outputs the signal as a serialized signal;
wherein the decoding section low-density-parity-codes the output serialized signal, and outputs the signal as a transmitted signal; and
wherein any of frequency differences between channels of the Fourier transform section is a predetermined coherent bandwidth or more.

3. A transmitting method comprising:
a coding step:
a serial-to-parallel conversion step;
a unitary matrix modulation step;
a split step;
an inverse Fourier transform step and
a transmitting step,
wherein in the coding step, an input of a transmitting signal is received and the received signal is low-density-parity-coded, and the coded signal is output;
wherein in the serial-to-parallel conversion step, the output coded signal is converted from serial to parallel, and m (m≧2) intermediate signals are output;
wherein in the unitary matrix modulation step, the output m intermediate signals are modulated to a unitary matrix of m rows and m columns where elements excepting diagonal elements are zero, and an obtained matrix is output;
wherein in the split step, each of the diagonal elements of the output matrix is supplied to each input channel of the inverse Fourier transform section as an input signal;
wherein in the inverse Fourier transform step, the input signals supplied to the input channels are inversely Fourier transformed, and obtained m inversely Fourier transformed signals are output;
wherein in the parallel-to-serial conversion step, the output m inversely Fourier transformed signals are converted from parallel to serial, and one transmission signal is output;
wherein in the transmitting step, the output transmission signal is transmitted; and wherein any of frequency differences between the channels in the inverse Fourier transform step is a predetermined coherent bandwidth or more.

4. A receiving method comprising:
a receiving step;
a serial-to-parallel conversion step;
a Fourier transform step;
an inverse split step;
a unitary matrix demodulation step;
a parallel-to-serial conversion step; and
a decoding step,
wherein in the receiving step, a transmitted transmission signal is received and the signal is output as a received signal;
wherein in the serial-to-parallel conversion step, the output received signal is converted from serial to parallel, and m (m≧2) intermediate signals are output;
wherein in the Fourier transform step, the output m intermediate signals are Fourier transformed, and obtained m Fourier transformed signals are output;
wherein in the inverse split step, the output m Fourier transformed signals are supplied to the unitary matrix demodulation step;
wherein in the unitary matrix demodulation step, from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero are demodulated, and the signals are output as demodulated signals;
wherein in the parallel-to-serial conversion step, the plurality of modulated signals are convened from parallel to serial, and the signal is output as a serialized signal;
wherein in the decoding step, the output serialized signal is low-density-parity-coded, and the signal is output as a transmitted signal; and
wherein any of frequency differences between channels in the Fourier transform step is a predetermined coherent bandwidth or more.

5. An information storage medium having stored thereon a program, when executed by a computer, for controlling said computer to function a coding section, a serial-to-parallel conversion section, a unitary matrix modulation section, a split section, an inverse Fourier transform section, and a transmitting section,
said program controls said computer,
to receive an input of a transmitting signal and low-density-parity-codes the received signal, and output the coded signal;
to convert the output coded signal from serial to parallel, and output m (m>=2) intermediate signals;
to modulate the output m intermediate signals to a unitary matrix of m rows and m columns where elements excepting diagonal elements are zero, and output an obtained matrix;
to supply each of the diagonal elements of the output matrix to each input channel of the inverse Fourier transform as an input signal;
to inversely Fourier transform the input signals supplied to the input channels, and output obtained m inversely Fourier transformed signals;
to convert the output m inversely Fourier transformed signals from parallel to serial, and output one transmission signal;
to transmit the output transmission signal; and any of frequency differences between the channels of the inverse Fourier transform is a predetermined coherent bandwidth or more.

6. An information storage medium having stored thereon, a program, when executed by a computer for controlling said computer to function a receiving section, a serial-to-parallel conversion section, a Fourier transform section, an inverse split section, a unitary matrix demodulation section, a parallel-to-serial conversion section, and a decoding section, said program controls said computer;

to receive a transmitted transmission signal and output the signal as a received signal;

to receive the output received signal from serial to parallel, and output, m (m>=2) intermediate signals;

to Fourier transform, the output m intermediate signals, and output obtained m Fourier transformed signals;

to supply the output m Fourier transformed signals to the unitary matrix demodulation section;

to demodulate from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero, and output the signals as demodulated signals;

to convert the plurality of modulated signals from parallel to serial, and output the signal as a serialized signal;

to low-density-parity-code the output serialized signal, and output the signal as a transmitted signal; and any of frequency differences between channels of the Fourier transform is a predetermined coherent bandwidth or more.

7. A transmitter comprising:

a coding section:

a serial-to-parallel conversion section;

a plurality of unitary matrix modulation sections;

a split section;

an inverse Fourier transform section;

a parallel-to-serial conversion section; and a transmitting section, wherein the coding section receives an input of a transmitting signal and low-density-parity-codes the received signal, and outputs the coded signal;

wherein the serial-to-parallel conversion section receives an input of the output coded signal and converts the signal from serial to parallel, and outputs m×n (m≧2, n≧1) intermediate signals;

wherein each of the plurality of unitary matrix modulation sections modulates the output any m of intermediate signals of the output m×n (m≧2, n≧1) intermediate signals without overlaps to a unitary matrix of m rows and m columns where elements excepting diagonal elements are zero, and outputs an obtained matrix;

wherein the split section supplies each of the diagonal elements of the output matrix to each input channel of the inverse Fourier transform section as an input signal;

wherein the inverse Fourier transform section inversely Fourier transforms the input signals supplied to the input channels, and outputs obtained m inversely Fourier transformed signals;

wherein the parallel-to-serial conversion section converts the output m inversely Fourier transformed signals from parallel to serial, and outputs one transmission signal;

wherein the transmitting section transmits the output transmission signal; and wherein any of frequency differences between the channels to which the diagonal elements of the matrix are given from the plurality of unitary matrix modulation sections is a predetermined coherent bandwidth or more, among the channels of the inverse Fourier transform section.

8. The transmitter according to claim 7, wherein the diagonal elements (0≧1>n, 0≧j>m) of j-th row and j-th column of a matrix output from an ith unitary matrix modulation are given to a j×m+i-th input channel of the inverse Fourier transform section, among the plurality of unitary matrix modulation sections.

9. A receiver comprising:

a receiving section;

a serial-to-parallel conversion section;

a Fourier transform section;

an inverse split section;

a plurality of unitary matrix demodulation sections;

a parallel-to-serial conversion section; and a decoding section, wherein the receiving section receives a transmitted transmission signal and outputs the signal as a received signal;

wherein the serial-to-parallel conversion section converts the output received signal from serial to parallel, and outputs m×n (m≧2, n≧1) intermediate signals;

wherein the Fourier transform section Fourier transforms the output m×n intermediate signals, and outputs obtained m×n Fourier transformed signals;

wherein the inverse split section supplies the output m×n Fourier transformed signals to each of the unitary matrix demodulation sections by n without overlaps;

wherein each of the plurality of unitary matrix demodulation sections demodulates, from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero, and outputs the signals as demodulated signals;

wherein the parallel-to-serial conversion section converts the plurality of modulated signals from parallel to serial, and outputs the signal as a transmitted signal;

wherein the decoding section low-density-parity-codes the output serialized signal, and outputs the signal as a transmitted signal; and wherein any of frequency differences between the channels, each from which the Fourier transformed signal given to each of the plurality of unitary matrix modulation sections is output, is a predetermined coherent bandwidth or more, among the channels of the Fourier transform section.

10. The receiver according to claim 9, wherein each of the plurality of unitary matrix demodulation sections compares each of predetermined plurality of unitary matrixes, which are unitary matrixes of m rows and m columns where elements excepting the diagonal elements are zero, with each of the matrixes of m rows and m columns where each of the supplied m Fourier transformed signals is a diagonal element and elements excepting the diagonal elements are zero, selects a matrix having a minimum Euclidean distance among from the predetermined plurality of unitary matrixes, and sets the selected matrix as a demodulation result.

11. The receiver according to claim 10, wherein the diagonal elements (0≧i>n, 0≧j>m) of j-th row and j-th column of a matrix compared by an ith unitary matrix demodulation are output from a j×m+i-th output channel of the inverse Fourier transform section, among the plurality of unitary matrix demodulation sections.

12. An information storage medium having stored thereon a program, when executed by a computer, for controlling said computer to function a coding section, a serial-to-parallel conversion section, a plurality of unitary matrix modulation sections, a split section, an inverse Fourier transform section, a parallel-to-serial conversion section, and a transmitting section, said program controls said computer;
to receive an input of a transmitting signal and low-density-parity-codes the received signal, and output the coded signal;
to receive input of the output coded signal and convert the signal from serial to parallel, and output m×n (m>=2, n>=) intermediate signals;
to each modulate the output any m of intermediate signals of the output m×n (m>=2, n>=1) intermediate signals without overlaps to a unitary matrix of m rows and m columns where elements excepting diagonal elements are zero, and output an obtained matrix;
to supply each of the diagonal elements of the output matrix to each input channel of the inverse Fourier transform as an input signal;
to inversely Fourier transform the input signals supplied to the input channels, and output obtained m inversely Fourier transformed signals;
to convert the output m inversely Fourier transformed signals from parallel to serial, and output one transmission signal;
to transmit the output transmission signal; and any of frequency differences between the channels to which the diagonal elements of the matrix are given from the plurality of unitary matrix modulations is a predetermined coherent bandwidth or more, among the channels of the inverse Fourier transform.

13. The information storage medium having stored thereon said program according to claim 12, wherein said program controls said computer to function in such a way that the diagonal elements (0>=i>n, 0>=j>m) of j-th row and j-th column of a matrix output from an ith unitary matrix modulation are given to a j×m+i-th input channel of the inverse Fourier transform among the plurality of unitary matrix modulations.

14. An information storage medium having stored thereon a program when executed by a computer, for controlling said computer to function a receiving section, a serial-to-parallel conversion section, a Fourier transform section, an inverse split section, a plurality of unitary matrix demodulation sections, a parallel-to-serial conversion section, and a decoding section, said program controls said computer;
to receive, a transmitted transmission signal and output the signal as a received signal;
to convert the output received signal from serial to parallel, and output m×n (m>=2, n>=1) intermediate signals;
to Fourier transform the output m×n intermediate signals, and output, obtained m×n Fourier transformed signals;
to supply the out put m×n Fourier transformed signals to each of the unitary matrix demodulation sections by n without overlaps;
to each demodulate from matrixes of m rows and m columns where each of the supplied m Fourier transformed signals is a diagonal element and elements excepting the diagonal elements are zero, the signals associated with the unitary matrixes of m rows and m columns where elements excepting diagonal elements are zero, and output the signals as demodulated signals;
to convert the plurality of modulated signals from parallel to serial, and output the signal as a transmitted signal;
to low-density-parity-code the output serialized signal, and output the signal as a transmitted signal; and
any of frequency differences between the channels, each from which the Fourier transformed signal given to each of the plurality of unitary matrix modulations is output, is a predetermined coherent bandwidth or more, among the channels of the Fourier transform.

15. The information storage medium having stored thereon said program according to claim 14, wherein said program controls said computer to function in such a way that each of the plurality of unitary matrix demodulations compares each of predetermined plurality of unitary matrixes, which are unitary matrixes of m rows and m columns where elements excepting the diagonal elements are zero, with each of the matrixes of m rows and m columns where each of the supplied m Fourier transformed signals is a diagonal element and elements excepting the diagonal elements are zero, selects a matrix having a minimum Euclidean distance among from the predetermined plurality of unitary matrixes, and sets the selected matrix as a demodulation result.

16. The information storage medium having stored thereon said, program according to claim 15, wherein said program controls said computer to function in such a way that the diagonal elements (0>=i>n, 0>=j>m) of j-th row and j-th column of a matrix compared by an ith unitary matrix demodulation are output from a j×m+i-th output channel of the inverse Fourier transform among the plurality of unitary matrix demodulations.

\* \* \* \* \*

UNITED STATES PATENT AND TRADEMARK OFFICE
CERTIFICATE OF CORRECTION

PATENT NO. : 7,633,850 B2
APPLICATION NO. : 10/582815
DATED : December 15, 2009
INVENTOR(S) : Chang-Jun Ahn It is certified that error appears in the above-identified patent and that said Letters Patent is hereby corrected as shown below:

An error was made in Claim 4 at Column 18, Line 33:

Please delete "convened" and add -- converted --.

An error was made in Claim 8 at Column 20, Line 5:

Please delete "0>= 1> n, 0>= j > m" and add -- 0=< i < n, 0=< j < m --.

An error was made in Claim 11 at Column 20, Line 63:

Please delete "0>= 1> n, 0>= j > m" and add -- 0=< i < n, 0=< j < m --.

An error was made in Claim 13 at Column 21, Line 38:

Please delete "0>= 1> n, 0>= j > m" and add -- 0=< i < n, 0=< j < m --.

An error was made in Claim 14 at Column 22, Line 8:

Please delete "out put" and add -- output --.

An error was made in Claim 16 at Column 22, Line 43:

Please delete "0>= 1> n, 0>= j > m" and add -- 0=< i < n, 0=< j < m --.

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,633,850 B2
APPLICATION NO. : 10/582815
DATED : December 15, 2009
INVENTOR(S) : Chang-Jun Ahn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Ninth Day of November, 2010

David J. Kappos
*Director of the United States Patent and Trademark Office*